Dec. 25, 1934.  W. J. FROHMUTH ET AL  1,985,492
SOLDERING TOOL
Filed Feb. 3, 1933
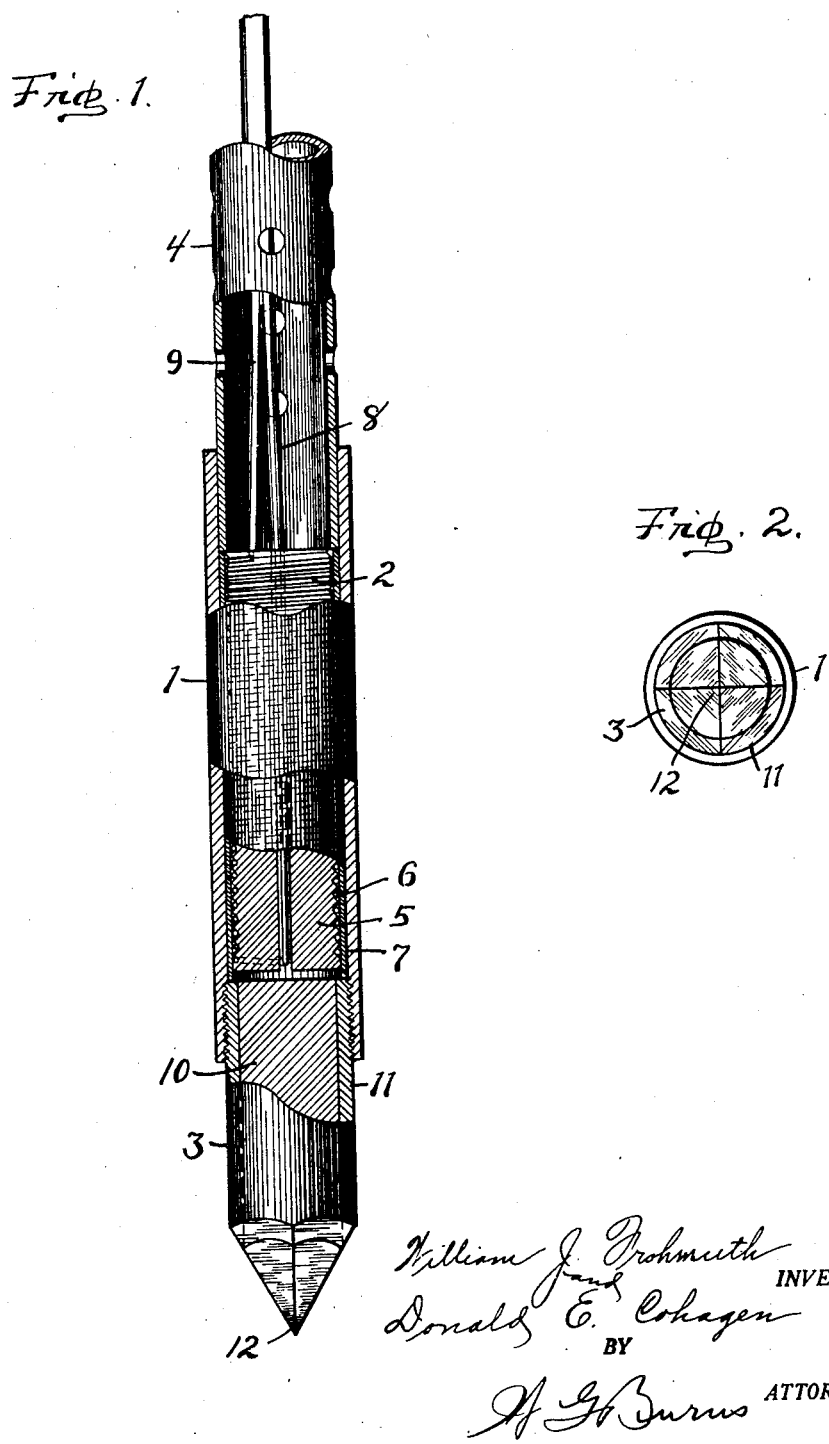

Patented Dec. 25, 1934

1,985,492

UNITED STATES PATENT OFFICE 1,985,492

SOLDERING TOOL

William J. Frohmuth and Donald E. Cohagen, Fort Wayne, Ind.

Application February 3, 1933, Serial No. 654,992

2 Claims. (Cl. 113—105)

This invention relates to improvements in soldering tools, and one of the objects thereof is to provide a tool of its class with a durable and renewable tip. Another object is to afford in an electrically heated soldering tool conveniently replaceable parts particularly the heating unit and the soldering tip. And, a further object of the invention is to construct the tip for the tool in such manner that it will endure constant usage for long protracted periods as is required in manufacturing operations.

In ordinary practice the tips of soldering tools commonly made of copper soon become impaired and inefficient because of the deteriorative effects of corrosion induced by gas arising from the use of flux and heat applied during the soldering operations. In this instant invention a purpose is to prevent such effects in order to protract the life of the tip.

An illustrative embodiment of the invention is shown in the accompanying drawing forming part hereof in which:—

Fig. 1 is an elevation showing the head portion of a soldering tool of the electrically heated type with the invention embodied therein, portions being cut away to disclose the interior construction; and Fig. 2 is a front end view of the tool.

The illustrative embodiment of the invention consists of a sleeve 1 constituting a heating chamber; a heating unit 2 removably disposed in the chamber; a soldering tip 3 one end of which is removably secured in one end of the sleeve; and a vented shank 4 secured in the opposite end of the sleeve, which is part of a handle for the tool.

The sleeve 1 is preferably tubular in form and made of any suitable metal having efficient heat conducting properties, such, for example, an alloy of nickel and copper. One end of the sleeve is internally threaded to receive the tip 3, and in its opposite end the shank is firmly secured, preferably by making a tight fit between the sleeve and shank.

The electrical heating unit 2 is of any suitable construction, such as one formed with a core 5 of lava, which is externally threaded, on which is wound a resistance wire 6, and around which is disposed a jacket 7 of insulating material preferably of mica. The ends of the resistance wire are connected with corresponding leads 8 and 9 that extend from the core out through the handle to a source of electrical energy (not shown). The core is shaped and proportioned so as to approximately fit in the sleeve in the space between the inserted ends of the tip and shank.

The tip 3 is formed with an inner axial body 10 of solid copper and a circumferential tubular covering 11 of non-corrosive metal, preferably an alloy of nickel and copper in which the nickel predominates in a ratio with the copper of approximately two to one. The covering and the inner body are fitted tightly together by forcing the copper body under high pressure into the bore of the covering, the wall of which is of sufficient thickness as to withstand the consequent radial outward pressure of the body. One end of the covering is externally threaded to fit the internally threaded sleeve, and the opposite end of the covering and the body is tapered so that the copper body protrudes beyond the corresponding end of the covering to a point 12.

In use, the tapered end of the tip 3 is tinned as in the established practice preliminary to its use in applying solder which is carried out as in the ordinary manner with the aid of a suitable flux. The sleeve 1 and the tip secured therein is heated and sustained at the desired temperature as may be required by the current supplied through the heating unit. The flux or vaporous gas arising therefrom upon becoming hot is kept from contacting with the copper inner body of the tip back of its pointed end by the coating 11 which circumvents corrosion and deterioration of the copper body so that the life thereof is indefinitely protracted even though the tool is subjected to numerous changes of temperature and severe usage.

We claim:

1. A soldering tip having an inner axial body of solid copper and a covering of non-corrosive metal encompassing the circumferential wall of said body, one end of said tip being shaped so that the copper body protrudes beyond the corresponding end of said covering to form a soldering point, and the opposite end of said tip being externally threaded for detachable connection with a soldering tool.

2. A soldering tip having an inner axial body of solid copper and a covering of non-corrosive metal encompassing the circumferential wall of said body, one end of said tip being shaped so that the copper body protrudes beyond the corresponding end of said covering to form a soldering point, and means for detachably securing said tip in a soldering tool.

WILLIAM J. FROHMUTH.
DONALD E. COHAGEN.